US007886096B2

(12) United States Patent
Gadgil

(10) Patent No.: US 7,886,096 B2
(45) Date of Patent: Feb. 8, 2011

(54) THROUGHPUT MEASUREMENT OF A TOTAL NUMBER OF DATA BITS COMMUNICATED DURING A COMMUNICATION PERIOD

(75) Inventor: Salil Shirish Gadgil, Pune (IN)

(73) Assignee: Texas Instruments Incorporated, Dallas, TX (US)

( * ) Notice: Subject to any disclaimer, the term of this patent is extended or adjusted under 35 U.S.C. 154(b) by 132 days.

(21) Appl. No.: 12/188,265

(22) Filed: Aug. 8, 2008

(65) Prior Publication Data

US 2010/0034248 A1 Feb. 11, 2010

(51) Int. Cl.
*G06F 13/42* (2006.01)
*H04B 17/00* (2006.01)
(52) U.S. Cl. .......................... 710/106; 710/33; 710/34
(58) Field of Classification Search ............. 710/22–29, 710/31–34, 52–57, 105–107, 310; 375/225
See application file for complete search history.

(56) References Cited

U.S. PATENT DOCUMENTS 5,754,803 A * 5/1998 Regis .......................... 710/119
5,771,356 A * 6/1998 Leger et al. .................. 709/233
5,940,601 A * 8/1999 Molnar et al. ................ 710/305
6,772,243 B2 * 8/2004 Jones et al. .................... 710/57
6,823,412 B2 * 11/2004 Regis .......................... 710/121
6,938,143 B2 * 8/2005 Le .............................. 711/172
7,200,690 B2 * 4/2007 Singhal et al. ................ 710/22
7,272,677 B1 * 9/2007 Venkata et al. ................ 710/71
7,613,856 B2 * 11/2009 Kastein et al. ................ 710/74
2008/0307133 A1 * 12/2008 Priel et al. ................... 710/106

* cited by examiner

*Primary Examiner*—Raymond N Phan
(74) *Attorney, Agent, or Firm*—Robert D. Marshall, Jr.; W. James Brady; Frederick J. Telecky, Jr.

(57) ABSTRACT

A method, system, and apparatus to hardware initiated throughput (HITM) measurement inside an OCP system using OCP side band signals are disclosed. In one embodiment, a system of an integrated circuit includes a signal line located in the integrated circuit to communicate an electrical signal, a receiver circuit located in the integrated circuit coupled to the signal line, a transmitter module located in the integrated circuit to communicate a data stream to the receiver circuit through the signal line, and a throughput monitor circuit coupled to the signal line to measure a throughput value during a communication period of the data stream from the transmitter module. The system may include a processor module located in the integrated circuit configured to interrupt an operation of the transmitter module and a receiver module if the throughput monitor circuit generates the interrupt signal.

20 Claims, 10 Drawing Sheets

HERE
EOA = LAST TRANSFER
SOA = FIRST TRANSFER
OCP COMMAND = ASSERTED BY THE MASTER
COMMAND ACCEPT = ASSERTED BY THE SLAVE TO
INDICATE THAT THE COMMAND HAS BEEN
ACCEPTED AND PROCESSED.

US 7,886,096 B2

THROUGHPUT MEASUREMENT OF A TOTAL NUMBER OF DATA BITS COMMUNICATED DURING A COMMUNICATION PERIOD

FIELD OF TECHNOLOGY

This disclosure relates generally to an enterprise method, a technical field of software and/or hardware technology and, in one example embodiment, to hardware initiated throughput (HITM) measurement inside an open core protocol (OCP) system using OCP side band signals.

BACKGROUND

A throughput (e.g., a rate of a successful message delivery over a communication channel measured by data bits per second) loss may occur in an integrated circuit (e.g., a semiconductor integrated circuit, silicon chip, etc.). Throughput loss may be the result of an architectural constraint and/or a design limitation within the integrated circuit itself. A designer of the integrated circuit may use a process to detect the throughput loss in order to validate network architecture.

The process may include detecting a particular transmission line (e.g., a computer bus, a subsystem that transfers data between computer components) in the integrated circuit that may not be providing an expected throughput. However, the process may not detect a location in the particular transmission line of a deficiency in the throughput occurred. It may be an additional task for the user (e.g., designer, chip architect, system developer, etc.) to determine the location and/or a cause of a throughput deficiency. The additional task may be a time consuming and/or increase the cost of designing the integrated circuit.

SUMMARY

A method, system, and apparatus to hardware initiated throughput (HITM) measurement inside an OCP system using OCP side band signals are disclosed. In one aspect, a system of an integrated circuit includes a signal line located in the integrated circuit to communicate an electrical signal, a receiver circuit located in the integrated circuit coupled to the signal line, a transmitter module located in the integrated circuit to communicate a data stream to the receiver circuit through the signal line, and a throughput monitor circuit coupled to the signal line to measure a throughput value during a communication period of the data stream from the transmitter module. An OCP system may be an open core protocol system.

The transmitter module may generate a start of availability (e.g., SOA) signal at an initiation of the communication period from the transmitter module. The transmitter module may generate an end of availability (e.g., EOA) signal at a termination of the communication period from the transmitter module. The communication period may be initiated with a generation of the start of availability signal and terminated with generation of the end of availability signal. The start of availability and/or the end of availability signals may be a side band signal. The throughput monitor circuit may compare the throughput value with a specified throughput value. The throughput monitor circuit may generate an interrupt signal if the throughput value is less than the specified throughput value.

A throughput module (e.g. a throughput monitor) may tap the start of availability signal and/or the end of availability signal in order to measure the throughput.

The system may include a processor module located in the integrated circuit configured to interrupt an operation of the transmitter module and/or a receiver module if the throughput monitor circuit generates the interrupt signal. The system may also include a total number of transfer counter circuit of the throughput monitor circuit to determine a total number of communicated data bits during a period between the start of availability signal and/or the end of availability signal. In addition, the system may include a total time counter circuit of the throughput monitor circuit to measure the communication period between the start of availability signal and/or the end of availability signal. The throughput monitor circuit may determine the throughput value as the total number of communicated data bits per the communication period.

The transmitter module may be a first in first out (FIFO) module. The system may include FIFO modules and/or a throughput monitor modules. The FIFO modules may be coupled in series with the receiver module. Certain ones of throughput monitors may be coupled between of certain ones of the FIFO modules. The system may also include another throughput monitor circuit coupled to the signal line to continuously measure a continuous throughput value of the transmitter module.

In another aspect, a method of an integrated circuit includes coupling a transmitter module of the integrated circuit to another module of the integrated circuit with a signal line, configuring the transmitter module to communicate a data stream to the other module, communicating the data stream from the transmitter module to the other module through the signal line, and measuring a throughput value of the signal line between the transmitter module and the other module as a number of data bits per a specified time period during a communication of the data stream from the transmitter module to the other module.

The method may include configuring the transmitter module to generate a start of availability signal when the transmitter module may change from not communicating the data stream to communicating the data stream. The method may configure the transmitter module to generate an end of availability signal when the transmitter module may change from communicating the data stream to not communicating the data stream. The method may initiate a measurement of the throughput value with the start of availability signal. The method may terminate the measurement of the throughput value with the end of availability signal.

The start of availability signal may be an open core protocol (OCP) signal and the measurement of the throughput value initiates when the start of availability signal switches from a logic low state to a logic high state. The end of availability may be another OCP signal and the measurement of the throughput value terminates when the end of availability signal switches from another logic high to another logic low state. The method may include transmitter modules coupled in series. The method may be sequentially measured the throughput value after each transmitter module of the transmitter modules beginning with the transmitter module of the transmitter modules located nearest to the other module and sequentially continuing in a direction opposite to the direction of the communication of the data stream.

In yet another aspect, an apparatus for measuring a throughput of data in an integrated circuit includes a coupling circuit to couple the apparatus to a hub of an integrated device, a time consumed circuit to measure a time period between a start of availability signal and an end of availability signal of an open core protocol (OCP) as measured at the hub, a clock register circuit to determine a clock period that is a constant value, a number of transfers circuit to measure a number of transfers as measured at the hub, and an data width register circuit to determine a data width that is another constant value.

The apparatus may include a throughput computing circuit to determine a product of the time period and/or the clock period and another product of the number of transfers and the data width. The data width may be measured as a data per transfer. The number of transfers circuit may be a counter-type circuit. The time consumed circuit may be a counter-type circuit. A computing circuit may compute a throughput value as a quotient of the product and/or the other product. The time consumed circuit initiated a measurement of the time period when a start of availability signal switches from a logic high state to a logic low state and terminates the measurement of the time period when an end of availability signal switches from another logic high state to another logic low state.

The methods, systems, and apparatuses disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which.

Figure 1:
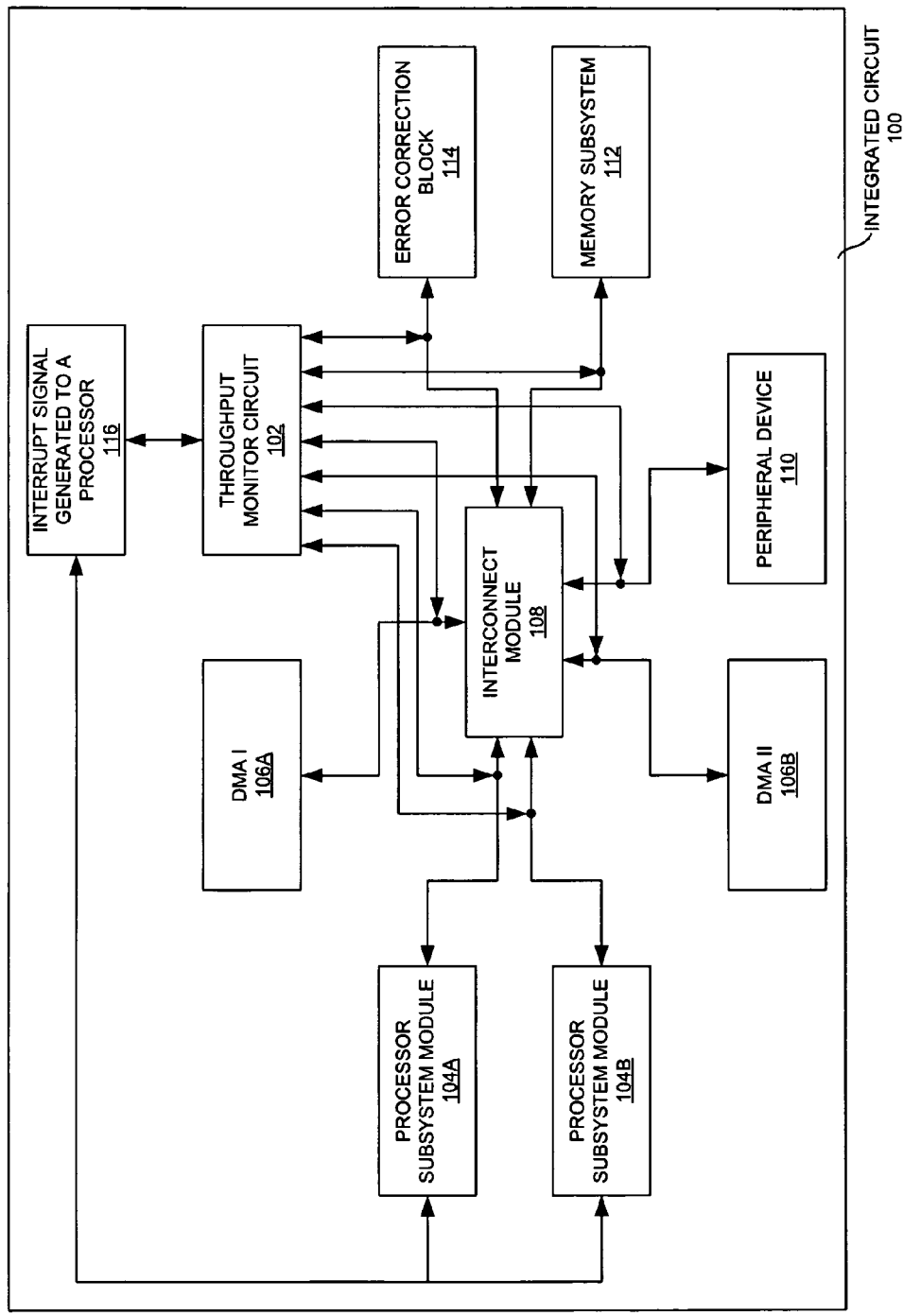
FIG. 1 is an integrated circuit that includes a throughput monitor circuit coupled to the signal line to measure a throughput value, according to one embodiment.

Other features of the present embodiments will be apparent from the accompanying drawings and from the detailed description that follows.

DETAILED DESCRIPTION

A method, system, and apparatus to hardware initiated throughput (HITM) measurement inside an open core protocol (OCP) system using OCP side band signals are disclosed. Although the present embodiments have been described with reference to specific example embodiments, it will be evident that various modifications and changes may be made to these embodiments without departing from the broader spirit and scope of the various embodiments.

In one embodiment, a system of an integrated circuit (e.g., the integrated circuit 100 of FIG. 1) includes a signal line (e.g., the signal line 208 of FIG. 2) located in the integrated circuit 100 to communicate an electrical signal (e.g., may be a digital signal, etc.), a receiver module (e.g., the receiver module 204 of FIG. 2) located in the integrated circuit 100 coupled to the signal line 208, a transmitter module (e.g., the transmitter module 200 of FIG. 2) located in the integrated circuit 100 to communicate a data stream (e.g., may be 8 bits, 16 bits, etc.) to the receiver module 204 through the signal line 208, and a throughput monitor circuit (e.g., the throughput monitor circuit 102 of FIG. 1) coupled to the signal line 208 to measure a throughput value during a communication period of the data stream from the transmitter module 200. A side band signal may be an OCP side band signal.

In another embodiment, a method of an integrated circuit (e.g., the integrated circuit 100 of FIG. 1) includes coupling a transmitter module (e.g., the transmitter module 200 of FIG. 2) of the integrated circuit 100 to another module of the integrated circuit 100 with a signal line (e.g., the signal line 208 of FIG. 2), configuring the transmitter module 200 to communicate a data stream (e.g., may be 8 bits, 16 bits, etc.) to the other module, communicating the data stream from the transmitter module 200 to the other module through the signal line 208, measuring a throughput value of the signal line 208 between the transmitter module 200 and the other module as a number of data bits per a specified time period during a communication of the data stream from the transmitter module 200 to the other module.

In yet another embodiment, an apparatus for measuring a throughput of data in an integrated circuit (e.g., the integrated circuit 100 of FIG. 1) includes a coupling circuit (e.g., the coupling circuit 412 of FIG. 4) to couple the apparatus to a hub of an integrated device (e.g., microprocessor, microcontroller, etc.), a time consumed circuit (e.g., the time consumed circuit 400 of FIG. 4) to measure a time period between a start of availability signal and an end of availability signal of an open core protocol (OCP) as measured at the hub, a clock register circuit (e.g., the clock register circuit 402 of FIG. 4) to determine a clock period that is a constant value, a number of transfers circuit (e.g., the number of transfers circuit 404 of FIG. 4) to measure a number of transfers as measured at the hub, and an data width register circuit (e.g., the data width register circuit 406 of FIG. 4) to determine a data width that is another constant value.

FIG. 1 is an integrated circuit that includes a throughput monitor circuit coupled to the signal line to measure a throughput value, according to one embodiment. Particularly, FIG. 1 illustrates an integrated circuit 100, a throughput monitor circuit 102, a processor subsystem module 104A-B, DMA I 106A, DMA II-B 106B, an interconnect module 108, a peripheral device 110, a memory subsystem 112, an error correction block 114, and an interrupt generated to a processor 116, according to one embodiment.

The integrated circuit 100 (e.g., may include a field-programmable gate array) may be a miniaturized electronic circuit (e.g., the semiconductor devices, the passive components, etc.) that may be constructed on a thin substrate of semiconductor material. The throughput monitor circuit 102 may monitor the throughput value (e.g., an amount of data transferred in a given time) during the communication period of the data stream between the transmitter module 200 and the receiver module 204. The processor subsystem modules 104A and 104B may be processing devices within the integrated circuit 100 that may process (e.g., communicate, control, etc.) the signals (e.g., may produce a light signal with the LED) to perform a specific task.

The DMA 1106A and DMA II-B 106B may allow certain hardware subsystems to access memory (e.g., registers, flip-flop, etc.) for reading and/or writing independent of the other processing device. The interconnect module 108 (e.g., wired circuit, etc.) may connect the processor subsystem modules 104A and 104B, throughput monitor circuit 102, and memory device (e.g., DMA, etc.) 106 within the integrated circuit 100. The peripheral device 110 may be (e.g., a processor, DMA, etc.) a piece of hardware that may communicate (e.g., through the interconnect module 108) with the host to perform some specific function. The memory subsystem 112 may be a device (e.g., a memory chip, buffer, etc.) which may be used to store the information (e.g., signal, etc.)

The error correction block 114 may be a block that may process (e.g., correct) the error information (e.g., bugs, wrong signals, etc.) that may occur in the integrated circuit 100. The interrupt generated to a processor 116 may be an interrupt generated by the interrupt generating circuit 414 (FIG. 4) of the throughput monitor circuit 102 to indicate the processor that there may be some throughput problems (e.g., low throughput and high throughput).

In example embodiment, the integrated circuit 100 may include the throughput monitor circuit 102 that may be connected to the interconnect module 108. The processor subsystem modules 104A and 104B may be connected to the interconnect module 108. The DMA 1106A and DMA II 106 B 106B may be connected to the interconnect module 108. The peripheral device 110 may be connected to the interconnect module 108. The memory subsystem 112 and the error correction block 114 may also be connected to the interconnect module 108. The throughput monitor circuit may monitor all the communication lines that may be connected through the interconnect module 108 (e.g., for calculating throughput).

In one embodiment, the throughput monitor circuit 102 may compare the throughput value with the specified throughput value. The throughput monitor circuit 102 may generate an interrupt signal if the throughput value may be less than the specified throughput value. The processor subsystem modules 104A and 104B located in the integrated circuit 100 may be configured to interrupt the operation of the transmitter module 200 and/or the receiver module 204 if the throughput monitor circuit 102 may generate the interrupt signal. The total number of transfer counter circuit of the throughput monitor circuit 102 may determine the total number of communicated data bits during the period between the start of availability (SOA) 608 signal and the end of availability (EOA) 610 signal. The total time counter circuit of the throughput monitor circuit 102 may measure the communication period between the start of availability (SOA) 608 signal and the end of availability (EOA) 610 signal. The throughput monitor circuit 102 may determine the throughput value as the total number of communicated data bits per the communication period. The FIFO modules and/or the throughput monitor modules may be included in the integrated circuit 100.

Figure 2:
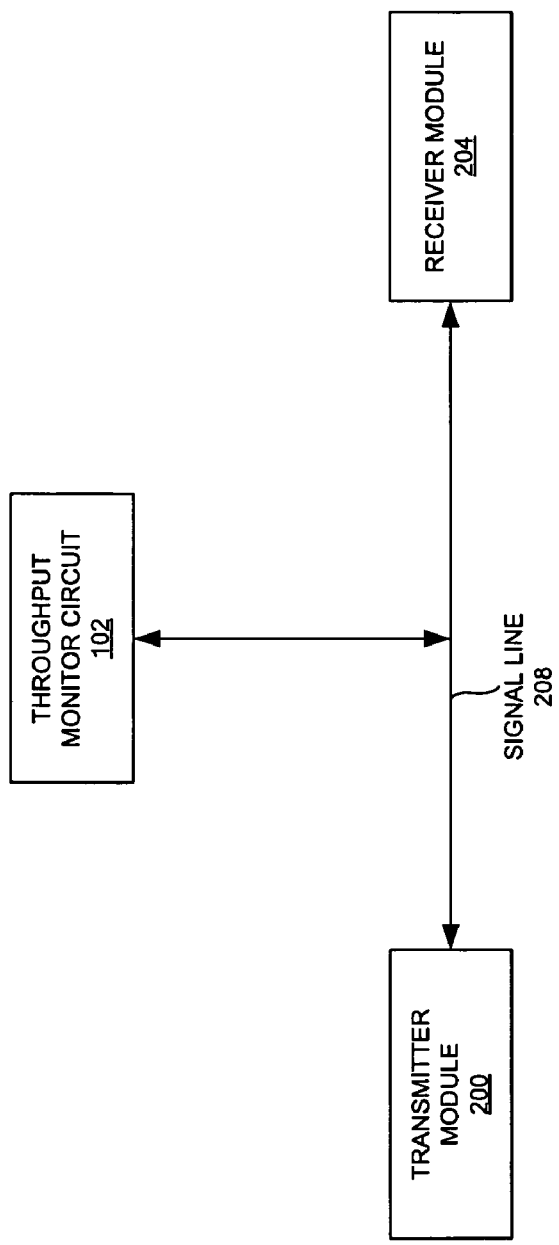
FIG. 2 is a systematic view illustrating the throughput monitor circuit coupled to the transmission line that may connect the receiver module and the transmitter module 200, according to one embodiment.

FIG. 2 is a systematic view illustrating the throughput monitor circuit coupled to the transmission line that may connect the receiver module and the transmitter module 200, according to one embodiment. Particularly, FIG. 2 illustrates the throughput monitor circuit 102, a transmitter module 200, a receiver module 204, and a signal line 208, according to one embodiment.

The transmitter module 200 may be a transmitting device which may transmit information (e.g., data signals, control signals, etc.) over signal line 208 to the receiver module 204. The receiver module 204 may be a device which may receive the information (e.g., data signals, control signals, etc.) from transmitter module 200. The signal line 208 may be a connecting line (e.g., the wire, the interconnect, the bus, etc.) which may be used for communication between devices in the integrated circuit 100.

In example embodiment, the throughput monitor circuit 102 may be connected to signal line 208 that may connect the transmitter module 200, and the receiver module 204.

In one embodiment, the signal line 208 located in the integrated circuit 100 may be communicated to the electrical signal. The receiver module 204 may be located in the integrated circuit 100 coupled to the signal line 208. The transmitter module 200 located in the integrated circuit 100 may be communicated to the data stream to the receiver module 204 through the signal line 208. The throughput monitor circuit 102 coupled to the signal line 208 may measure the throughput value during the communication period of the data stream from the transmitter module 200

Figure 3:
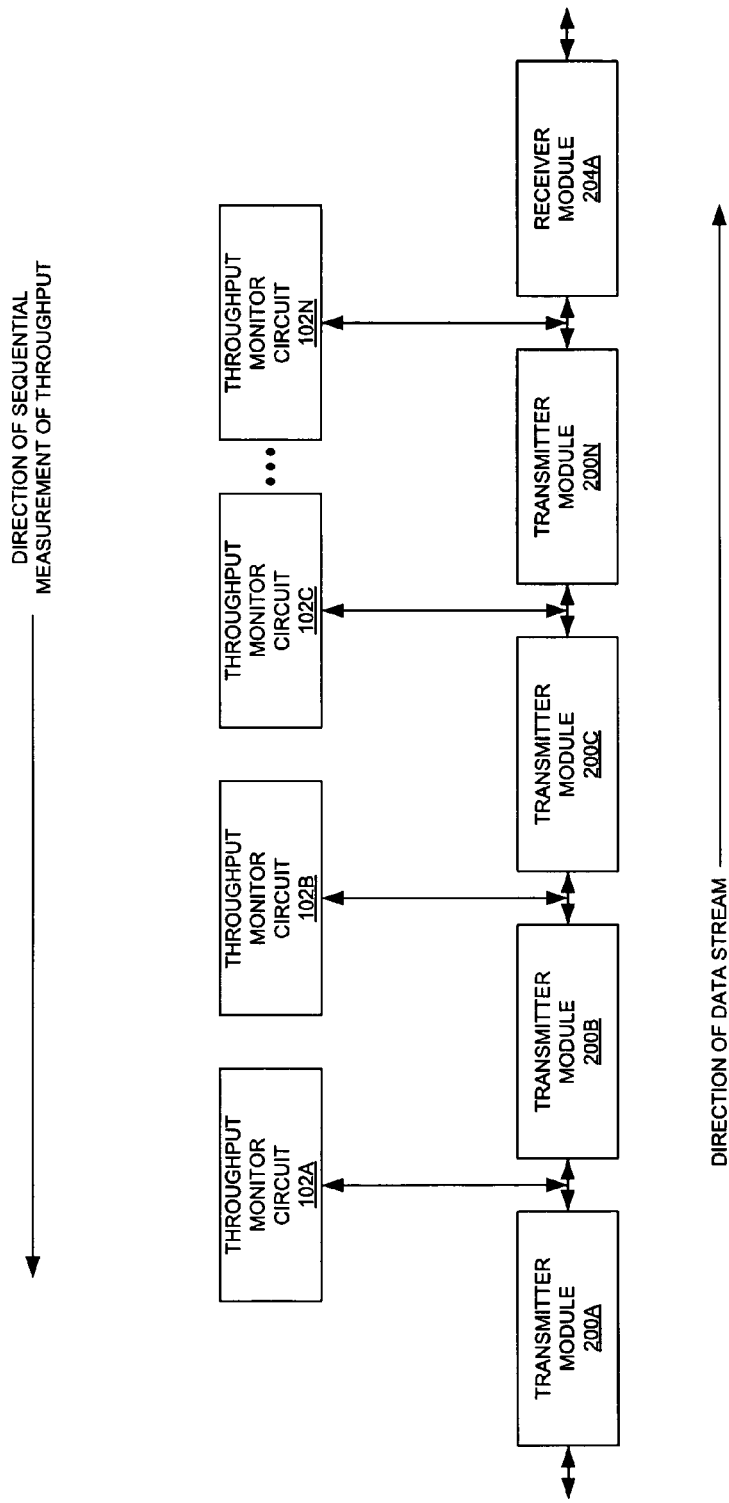
FIG. 3 is a system view illustrating a direction of sequential measurement of throughput, and a direction of data stream, according to one embodiment.

FIG. 3 is a system view illustrating a direction of sequential measurement of throughput, and a direction of data stream, according to one embodiment. Particularly, FIG. 3 illustrates throughput monitor circuits 102A to 102N, the transmitter modules 200A to 200N, and the receiver module 204, according to one embodiment.

In example embodiment, throughput monitor circuits 102A to 102N coupled with transmitter modules 200A to 200N, and the receiver module 204A in series that may show the direction of sequential measurement of throughput and the data stream.

In the example embodiment, the direction of measurement may be backwards. The measurement may be backwards because this may allow accurate detection of throughput loss at specific nodes. The direction of the data stream may be from the transmitter module 200A towards the receiver module 204A through various other intermediate transmitter modules 200B to 200N.

Figure 4:
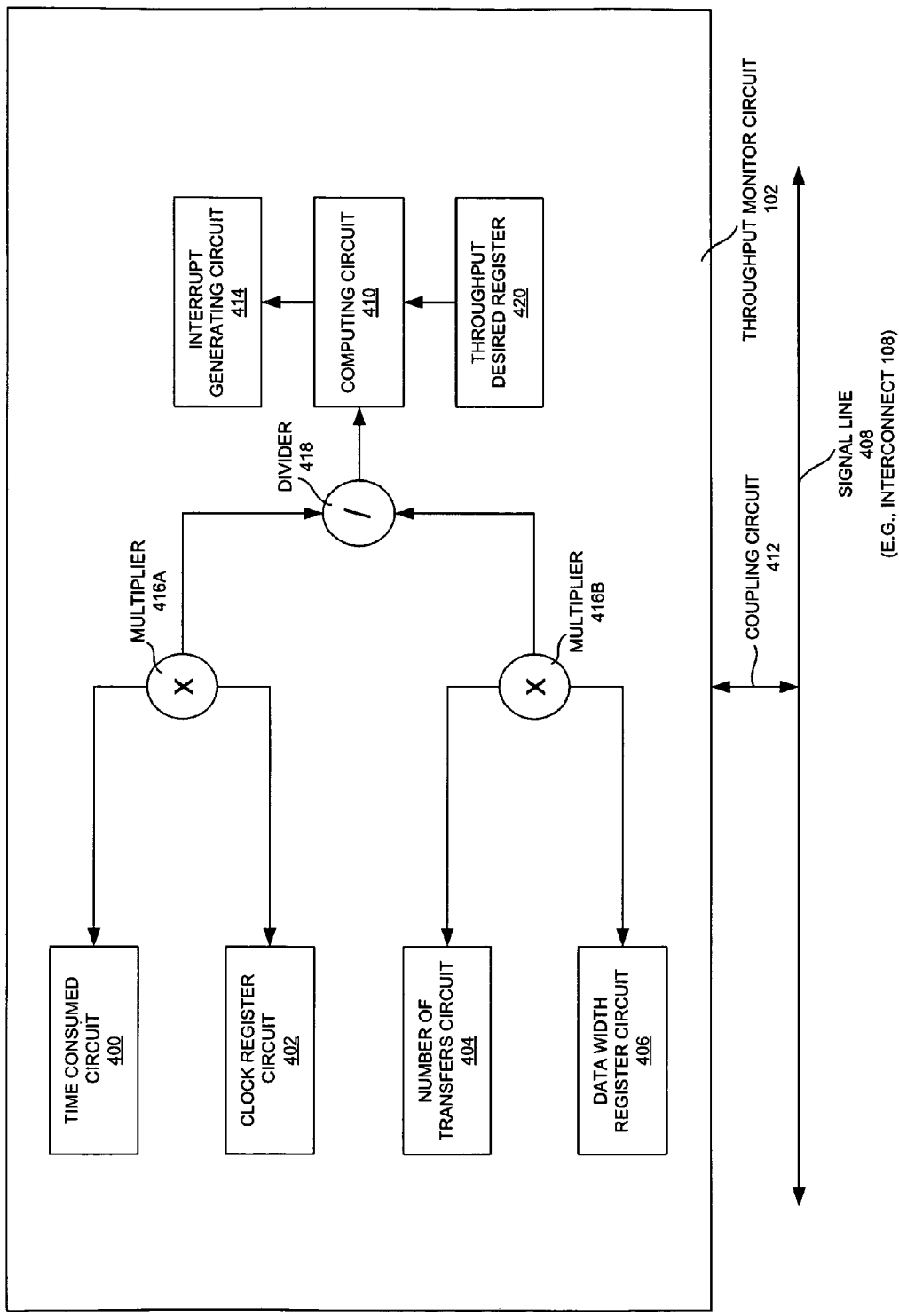
FIG. 4 is an exploded view of the throughput monitor circuit, according to one embodiment.

FIG. 4 is an exploded view of the throughput monitor circuit 102, according to one embodiment. Particularly, FIG. 4 illustrates a time consumed circuit 400, a clock register circuit 402, a number of transfers circuit 404, a data width register circuit 406, a signal line 408 (e.g., interconnect module 108), a computing circuit 410, a coupling circuit 412, an interrupt generating circuit 414, multipliers 416A and 416B, a divider 418, and a throughput desired register 420 according to one embodiment.

The time consumed circuit 400 may be a counter (e.g., made up of flip-flop, etc.) which may monitor the time elapsed during information transfer from transmitter to receiver. The clock register circuit 402 may be circuit (e.g., may be register) which may be used for programming the clock period. The number of transfers circuit 404 may be a circuit (e.g., the counter made up of the flip-flop, etc.) which may be used for measuring the total number of transfers of the data bits. The data width register circuit 406 may be the register circuit which may be used for processing (e.g., measuring, programming, etc.) the widths of data bits. The signal line 408 (e.g., interconnect) may be a communication line (e.g., a wire, interconnect, bus, etc.). The computing circuit 410 may a circuit that may be used for computing throughput value (e.g., data bits per second) which may include a throughput register (e.g., the storage register which may store the value of required throughput).

The coupling circuit 412 may be circuit which may be couple to the throughput monitor circuit 102 on the signal line 208 (e.g., wire, interconnect, bus, etc.). The interrupt generating circuit 414 may generate an interrupt when the achieved throughput value may be less than required throughput value (e.g., that may be stored in the register). Multipliers 416A and 416B may be computing circuit circuits (e.g., the flip flop, etc.) which may generate the product of the given input (e.g., time consumed, programmed clock period, number of transfers, and/or data width). The divider 418 may be the computing circuit that may compute the throughput value as a quotient of the product of multiplier 416A and the other product of multiplier 416B. The throughput desired register 420 may be a data storage device (e.g., memory device) that may hold information about the desired throughput in the communication lines.

In example embodiment, the time consumed circuit 400 may be multiplied by the clock register circuit 402 using the multiplier 416A to obtain the product. The number of transfers circuit 404 may be multiplied by the data width register circuit 406 using the multiplier 416B to obtain another product. The divider 418 may divide the product obtained by the multiplier 416A-B that may generate a quotient which is given to computing circuit 410 to compute throughput. The interrupt generating circuit 414 may be coupled with the computing circuit 410 that may generate the interrupt signal. The throughput monitor circuit 102 may be coupled with the signal line 408 (e.g., interconnect) by using the coupling circuit 412. The computing circuit 410 may require the throughput desired register 420 to determine whether the throughput is crossing the threshold in order to generate the interrupt.

Figure 5:
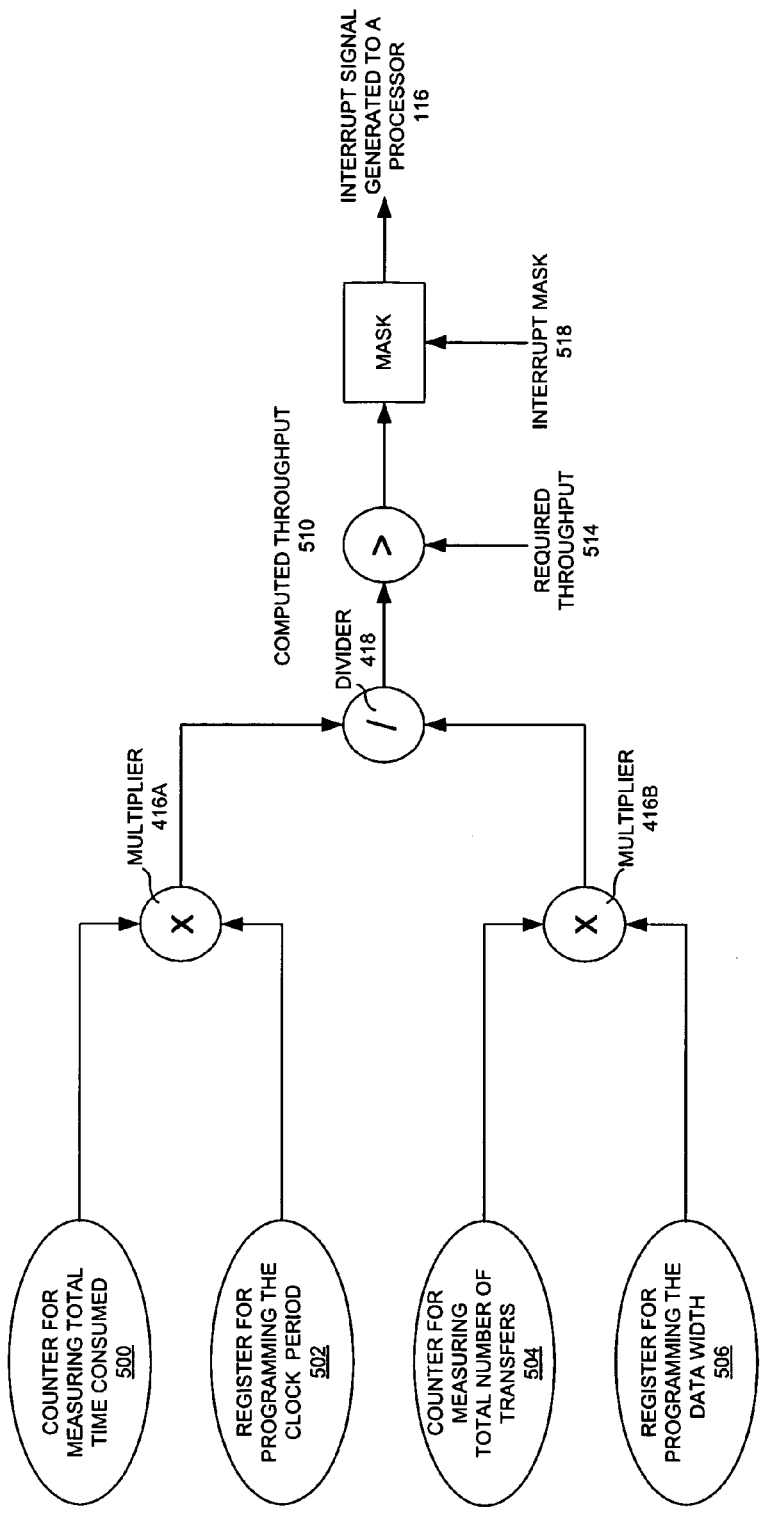
FIG. 5 is a systematic view illustrating a computation of the throughput value, according to one embodiment.

FIG. 5 is a systematic view illustrating a computation of the throughput value, according to one embodiment. Particularly, FIG. 5 illustrates the interrupt signal generated to a processor 116, multipliers 416A and 416B, a block 500, a block 502, a block 504, a block 506, a computed throughput 510, a required throughput 514, and an interrupt mask 518, according to one embodiment.

The block 500 may be a counter for measuring total time consumed (e.g., the counter made up of flip flops, etc.) which may be used for measuring the total time consumed for the data bits to transfer over a communicating line in a particular amount of time. The block 502 may be a register for programming the clock period (e.g., the register made up of flip-flops, etc.) which may be used for encoding the clock phase The block 504 may be a counter for measuring total number of transfers (e.g., counter made up of flip-flops, etc.) which may be used for counting the total number of data bits transferred on the signal line 208. The block 506 may be a register for programming the data width (e.g., may be register made up of flip-flops, etc.) which may be used to encode the length of data bits. The computed throughput 510 may be throughput value which may be obtained from the computing circuit (e.g., the divider 418, etc.). The required throughput 514 may be the throughput value which may be already stored in the storage register (e.g., made up of flip-flops, etc.). The interrupt mask 518 may be a masking command that may be generated to terminate a generation of the interrupt command to the subsystem module if a link fails to maintain a threshold throughput value.

In example embodiment, the counter for measuring total time consumed 500 may be multiplied by the register for programming the clock period block 502 using the multiplier 416A to obtain the product. The counter for measuring total number of transfers block 504 may be multiplied by the register for programming the data width 506 using the multiplier 416B to obtain another product. The divider 418 may divide the product obtained by multipliers 416A and 416B that may produce a quotient which is given to computed throughput 510, and the required throughput 514. The output of the computed throughput 510 may be given to mask using the interrupt mask 518 that may generate the interrupt.

Figure 6:
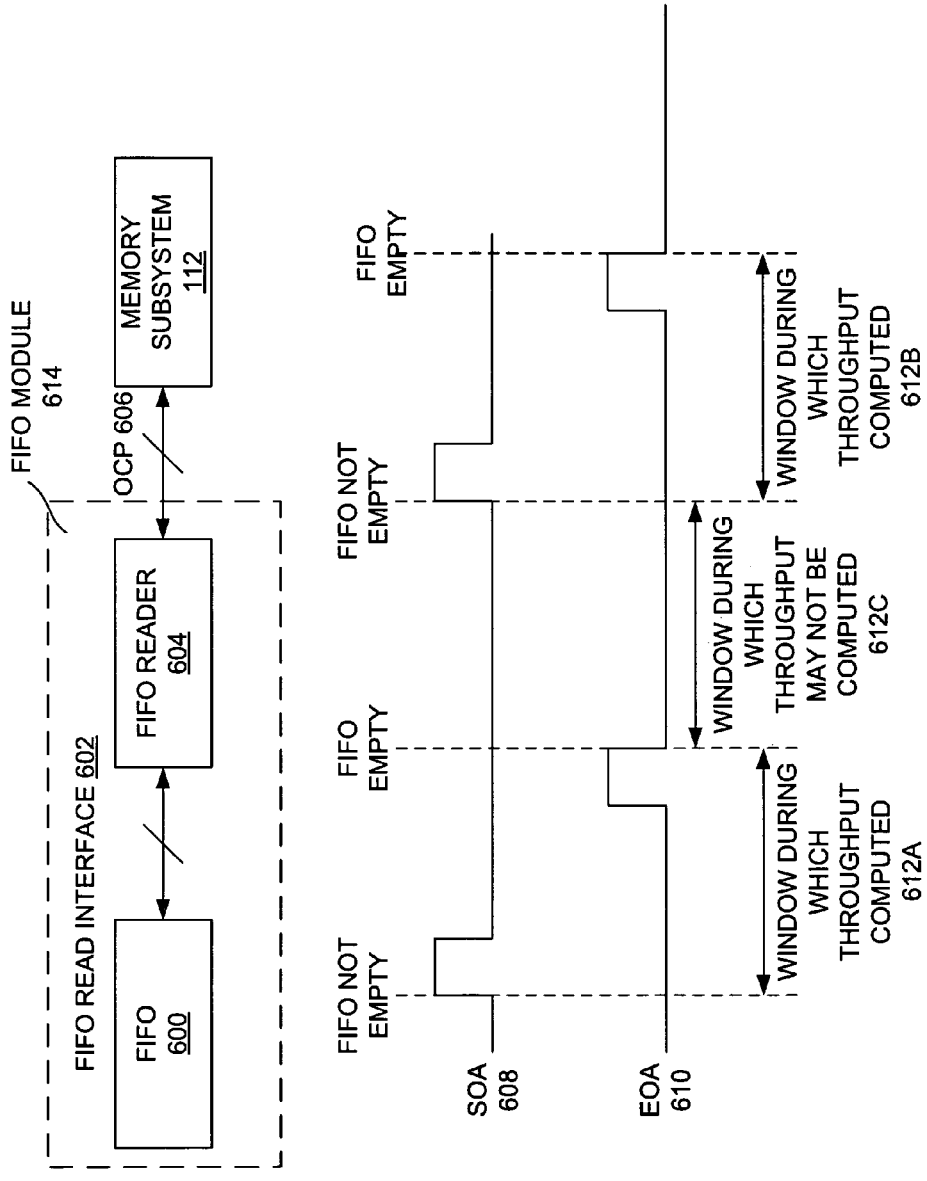
FIG. 6 is a diagrammatic view illustrating a FIFO module coupled with a memory subsystem, and a graphical view illustrating a communication period between a SOA signal and an EOA signal, according to one embodiment.

FIG. 6 is a diagrammatic view illustrating a FIFO module coupled with a memory subsystem, and a graphical view illustrating a communication period between a SOA signal and an EOA signal, according to one embodiment. Particularly, FIG. 6 illustrates the memory subsystem 112, a FIFO 600, a FIFO reader 604, an OCP 606, a SOA 608 (Start Of Availability), an EOA 610 (End Of Availability), a window during which throughput computed 612A and 612B, a window during which throughput may not be computed 612C and a FIFO module 614, according to one embodiment.

The FIFO 600 may be a storage device (e.g., the register, etc.) that may retrieve the element (e.g., the data, etc.) stored for the longest time. The FIFO read interface 602 may be a communication channel between the FIFO 600 and the FIFO reader 604. The FIFO reader 604 may read the data which may be the input and/or output data bits of the FIFO register. The OCP 606 (e.g., may interconnect two semiconductor cores on a single integrated circuit so that they may reliably communicate when synthesized and manufactured) may be protocol that may define the rules to communicate between the processor subsystem modules 104A and 104B. The SOA 608 (e.g., a sideband signal) may be the data (e.g., first data bit) that may enter the FIFO register which may result the FIFO register to be filled (e.g., FIFO not empty).

The EOA 610 (e.g., another side band signal) may be a data (e.g., last data bit) that may come out of FIFO register which may result the FIFO register to be empty (e.g., FIFO empty). The windows during which throughput computed 612A and 612B may be the window frame (e.g., the time period) which may indicate the period during which throughout may be computed. The window during which throughput may not be computed 612C may be the window frame (e.g., the time period) which may indicate the period during which throughout may not be computed. The FIFO module 614 may include the FIFO 600, FIFO reader 604, and FIFO read interface 602.

In example embodiment, the FIFO module 614 may include the FIFO 600, and the FIFO reader 604 that may be connected through the FIFO read interface 602 coupled to the memory subsystem 112 through the OCP 606. The SOA 608, and the EOA 610 may represent the waveforms of the data format entering into the FIFO module 614 that may show the window during which the throughput computed 612A and 612B.

In one embodiment, the transmitter module 200 may generate the start of availability 608 signal at the initiation of the communication period from the transmitter module 200. The transmitter module 200 may generate the end of availability 610 signal at the termination of the communication period from the transmitter module 200. The communication period may be initiated (e.g., by using the transmitter module 200 of FIG. 2) with the generation of the start of availability 608 signal and terminated (e.g., by using the receiver module 204 of FIG. 2) with the generation of the end of availability 610 signal. The start of availability (SOA) 608 and the end of availability (EOA) 610 signals may be side band signals. The transmitter module 200 may be the first in first out (FIFO) module (e.g., the first in first out module 614 of FIG. 6). The FIFO module 614 may be coupled in series with the receiver module 204. The throughput monitors may be coupled between the FIFO modules.

Figure 7:
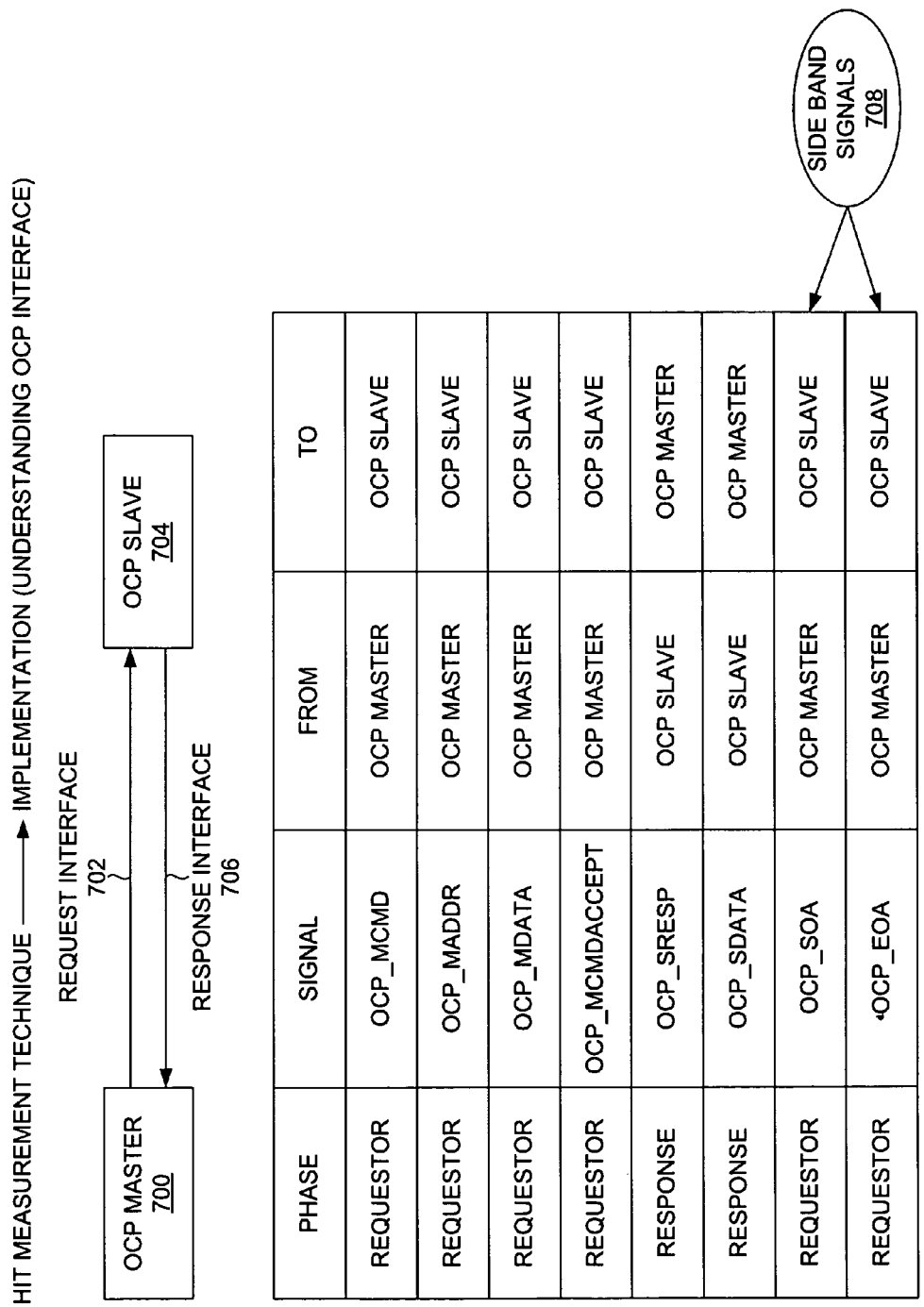
FIG. 7 is a table view illustrating HIT measurement implementation to compute the throughput using the side band signals, the OCP master, and the OCP slave that may communicate with each other, according to one embodiment.

FIG. 7 is a table view illustrating HIT measurement implementation to compute the throughput using the side band signals 708, the OCP master 700, and the OCP slave 704 that may communicate with each other, according to one embodiment. Particularly, FIG. 7 illustrates an OCP master 700, a request interface 702, an OCP slave 704, a response interface 706, and a side band signals 708, according to one embodiment.

The OCP master 700 may be a processor subsystem (e.g., the transmitting device, etc.) which may initiate commands (e.g., may enable the core to generate OCP requests such as READ or WRITE and may receive the READ responses) to the OCP slave 704. The request interface 702 may be the request command (e.g., OCP_MCMD, OCP_MADDR, OCP_MDATA, OCP_MCMDACCEPT, etc.) from the OCP master 700 to the OCP slave 704. The OCP slave 704 may be the processor subsystem (e.g. the receiving device, etc.) which may receive the commands (e.g., that may allow it to receive and respond to requests) from the OCP master for communication between the processor subsystem. The response interface 706 may be the response command (e.g., OCP_SRESP, OCP_SDATA, etc.) from the OCP slave 704 to the OCP master 700. The side band signals 708 may be the signals which may illustrate the starting bit (e.g., SOA) and the last bit (e.g., EOA) of the data frame.

In example embodiment, the OCP master 700 may send a request interface 702 command to the OCP slave 704. The OCP slave 704 may respond the response interface 706 to the OCP master 700. The table represents the communication signals between the OCP master 700 and the OCP slave 704 including the side band signals 708. The PHASE field may illustrate various requester and/or response command between the OCP master 700 and OCP slave 704. The signal field may illustrate various types of signals between the OCP master 700 and OCP slave 704 (e.g., OCP_MCMD, OCP_MADDR, OCP_MDATA, OCP_MCMDACCEPT, OCP_SOA, OCP_EOA etc,). The 'from' field may illustrate various types of OCP master and OCP slave signals coming from either master or slave. The 'to' field may illustrate various types of OCP master and OCP slave signals going to either master or slave signals. The side band signals 708 may illustrate OCP_SOA and OCP_EOA which may indicate the start bit and the last bit of the data frame. The requester phase may be sent from the OCP master 700 to the OCP slave 704 that may generate the signals like OCP_MCMD, OCP_MADDR, OCP_MDATA, OCP_MCMDACCEPT. The response phase may be sent from the OCP slave 704 to the OCP master 700 that may generate the signals like OCP_SRESP, OCP_SDATA.

Figure 8B:
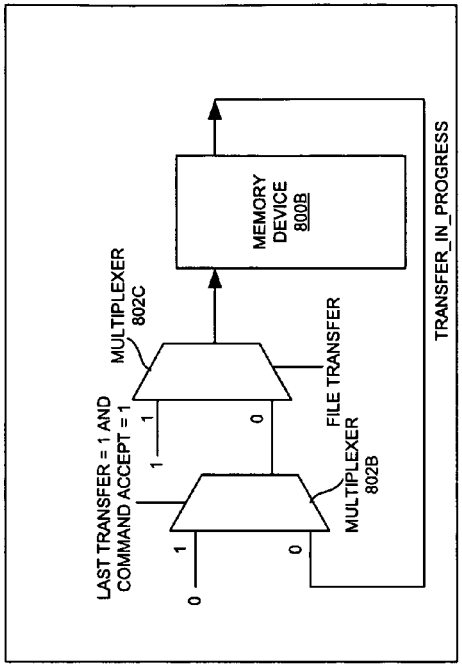
FIGS. 8A-8C illustrate a diagrammatic view illustrating the calculation of the total number of packets transferred and the total number of clocks consumed for the transfer of data, according to one embodiment.
Figure 8A:
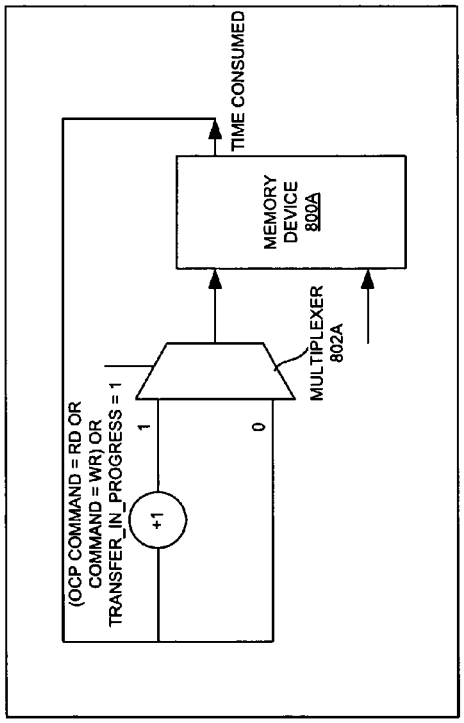
Figure 8C:
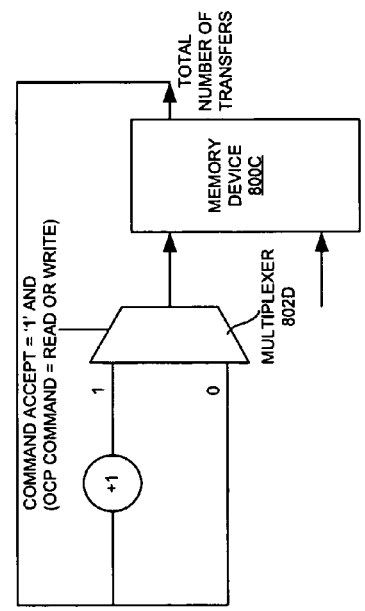

FIGS. 8A to 8C show a diagrammatic view illustrating the calculation of the total number of packets transferred and the total number of clocks consumed for the transfer of data, according to one embodiment. Particularly, FIGS. 8A to 8C illustrate memory devices 800A to 800C, and multiplexers 802A to 802C, according to one embodiment.

Each memory device 800A to 800C may be a counter (e.g., flip-flop, a storage device, etc.) which may be used to count the total number of clocks consumed and/or the total number of packets transferred. Each multiplexer 802A to 802D may be an electronic multiplexer that makes it possible for several signals to share one expensive device and/or other resource (e.g., the converter, etc.) instead of having one device per input signal.

In example embodiment, FIG. 8A may illustrate the memory device 800A may be coupled with the multiplexer 802A at its input that may calculate the time taken for transfer of the data. The output of the memory device 800A (e.g., time consumed) may be connected as input to the multiplexer 802A. FIG. 8B may illustrate the memory device 800B may be coupled with multiplexers 802B and 802C at its input that may show the transfer in progress of data. The output of the memory device 800B may be connected as input to the multiplexer 802C 802B. The output of the multiplexer 802C 802B may be connected to input of the multiplexer 802C. FIG. 8C may illustrate the memory device 800C may be coupled with the multiplexer 802D at its input that may calculate the total number of transfers of the data. The output of the memory device 800C (e.g., total transfers) may be connected as input to the multiplexer 802D.

Figure 9A:
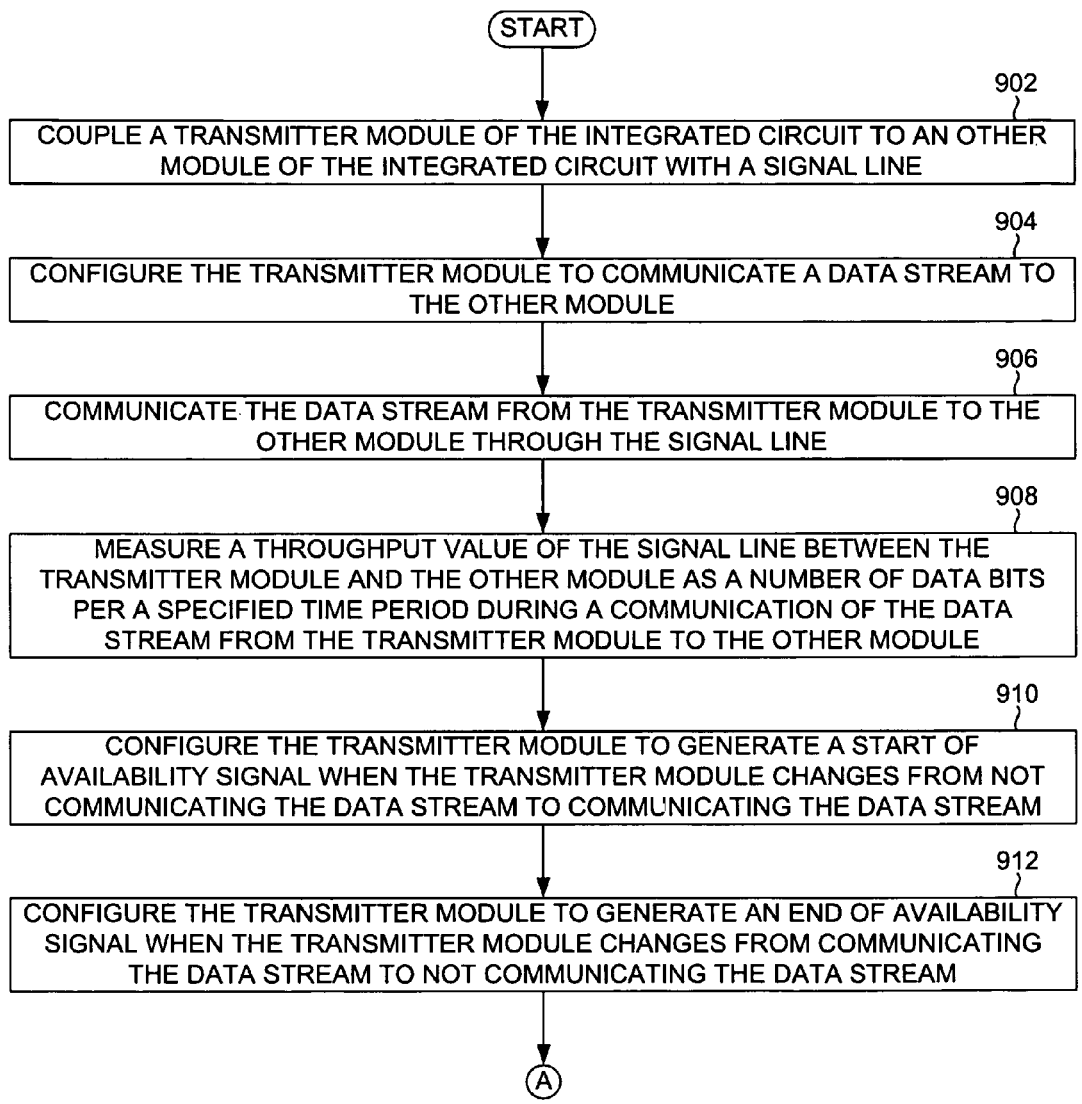
FIG. 9A is a process flow of coupling a transmitter module to the integrated circuit to another module of the integrated circuit with a signal line, according to one embodiment.

FIG. 9A is a process flow of coupling a transmitter module to the integrated circuit to another module of the integrated circuit with a signal line, according to one embodiment. In operation 902, a transmitter module (e.g., the transmitter module 200 of FIG. 2) of an integrated circuit (e.g., the integrated circuit 100 of FIG. 1) may be coupled to another module of the integrated circuit 100 with a signal line (e.g., the signal line 208 of FIG. 2). In operation 904, the transmitter module 200 may be configured to communicate a data stream to the other module. In operation 906, the data stream from the transmitter module 200 may be communicated to the other module through the signal line 208. In operation 908, a throughput value of the signal line 208 between the transmitter module 200 and the other module may be measured as a number of data bits per a specified time period during a communication of the data stream from the transmitter module 200 to the other module.

In operation 910, the transmitter module 200 may be configured to generate a start of availability (SOA) (e.g., the start of availability 608 of FIG. 6) signal when the transmitter module 200 may change from not communicating the data stream to communicating the data stream. In operation 912, the transmitter module 200 may be configured to generate an end of availability (EOA) (e.g., the end of availability 610 of FIG. 6) signal when the transmitter module 200 may change from communicating the data stream to not communicating the data stream.

Figure 9B:
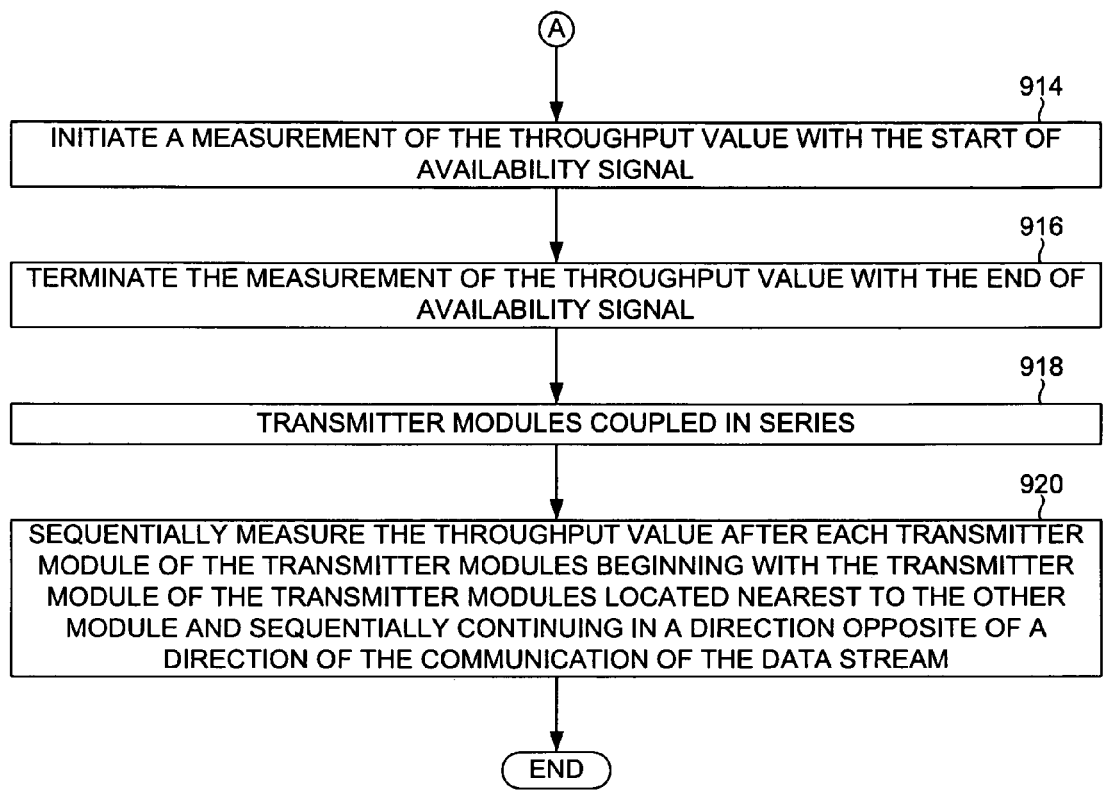
FIG. 9B is a continuation of process flow of FIG. 9A, illustrating additional operations, according to one embodiment.

FIG. 9B is a continuation of process flow of FIG. 9A, illustrating additional operations, according to one embodiment. In operation 914, a measurement of the throughput value may be initiated (e.g., by using the transmitter module 200 of FIG. 2) with the start of availability 608 (e.g., SOA) signal. In operation 916, the measurement of the throughput value may be terminated (e.g., by using the receiver module 204 of FIG. 2) with the end of availability 610 (e.g., EOA) signal. The start of availability 608 signal may be a side band signal and the measurement of the throughput value may be initiated when the start of availability 608 signal switches from a logic low state to a logic high state.

The end of availability 610 may be another side band signal and the measurement of the throughput value may terminate when the end of availability 610 signal switches from another logic high to another logic low state. In operation 918, the transmitter modules may be coupled in series. In operation 920, the throughput value may be sequentially measured after each transmitter module of the transmitter modules beginning with the transmitter module 200 of the transmitter modules 200A-N located nearest to the other module and sequentially continuing in a direction opposite to the direction of the communication of the data stream.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

Particularly, the interconnect module 108, the transmitter module 200, the receiver module 204, the FIFO module 614 of FIG. 1-9 may be enabled using software and/or using transistors, logic gates, and electrical circuits (e.g., application specific integrated ASIC circuitry) such as the integrated circuit 100, the throughput monitor circuit 102, a interconnect circuit, a transmitter circuit, a receiver circuit, the time consumed circuit 400, the clock register circuit 402, the number of transfers circuit 404, the data width register circuit 406, the computing circuit 410, the coupling circuit 412, the interrupt generating circuit 414, a FIFO circuit, and other circuit.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A system of an integrated circuit comprising:
a signal line located in the integrated circuit to communicate an electrical signal;
a receiver circuit located in the integrated circuit coupled to the signal line;
a transmitter module located in the integrated circuit to communicate a data stream to the receiver circuit through the signal line; and
a throughput monitor circuit coupled to the signal line to measure a throughput value of a total number of data bits communicated during a communication period of the data stream from the transmitter module to the receiver circuit via the signal line.

2. The system of claim 1:
wherein the transmitter module generates a start of availability signal at an initiation of the communication period from the transmitter module; and
wherein the transmitter module generates an end of availability signal at a termination of the communication period from the transmitter module.

3. The system of claim 2:
wherein the communication period is initiated with a generation of the start of availability signal and terminated with generation of the end of availability signal.

4. The system of claim 3 wherein at least one of the start of availability and the end of availability signals is an OCP side band signal.

5. The system of claim 3:
wherein the throughput monitor circuit compares the throughput value with a specified throughput value; and
wherein the throughput monitor circuit generates an interrupt signal if the throughput value is less than the specified throughput value.

6. The system of claim 5 further comprising a processor module located in the integrated circuit configured to interrupt an operation of at least one of the transmitter module and the receiver circuit if the throughput monitor circuit generates the interrupt signal.

7. The system of claim 6 further comprising a total number of transfer counter circuit of the throughput monitor circuit to determine a total number of communicated data bits during a period between the start of availability signal and the end of availability signal.

8. The system of claim 7 further comprising a total time counter circuit of the throughput monitor circuit to measure the communication period between the start of availability signal and the end of availability signal.

9. The system of claim 8 wherein the throughput monitor circuit determines the throughput value as the total number of communicated data bits per the communication period.

10. The system of claim 9 wherein the transmitter module is a first in first out (FIFO) module.

11. The system of claim 10:
further comprising a plurality of FIFO modules and a plurality of throughput monitor modules; wherein the plurality of FIFO modules are coupled in series with the receiver module; and
wherein certain ones of a plurality of throughput monitors are coupled between of certain ones of the plurality of FIFO modules.

12. The system of claim 9 further comprising another throughput monitor circuit coupled to the signal line to continuously measure a continuous throughput value of the transmitter module.

13. A method of an integrated circuit:
coupling a transmitter module of the integrated circuit to another module of the integrated circuit with a signal line;
configuring the transmitter module to communicate a data stream to the other module;
communicating the data stream from the transmitter module to the other module through the signal line; and
measuring a throughput value of the signal line between the transmitter module and the other module as a number of data bits per a specified time period during a communication of the data stream from the transmitter module to the other module.

14. The method of claim 13:
further comprising configuring the transmitter module to generate a start of availability signal when the transmitter module changes from not communicating the data stream to communicating the data stream,
further comprising configuring the transmitter module to generate an end of availability signal when the transmitter module changes from communicating the data stream to not communicating the data stream,
further comprising initiating a measurement of the throughput value with the start of availability signal; and
further comprising terminating the measurement of the throughput value with the end of availability signal.

15. The method of claim 14:
wherein the start of availability signal is an open core protocol (OCP) signal and the measurement of the throughput value initiates when the start of availability signal switches from a logic low state to a logic high state; and wherein the end of availability is another OCP signal and the measurement of the throughput value terminates when the end of availability signal switches from another logic high to another logic low state.

16. The method of claim 15:
further comprising a plurality of transmitter modules coupled in series; and
further comprising sequentially measuring the throughput value after each transmitter module of the plurality of transmitter modules beginning with the transmitter module of the plurality of transmitter modules located nearest to the other module and sequentially continuing in a direction opposite to the direction of the communication of the data stream.

17. An apparatus for measuring a throughput of data in an integrated circuit comprising:
a coupling circuit to couple the apparatus to a hub of an integrated device;
a time consumed circuit to measure a time period between a start of availability signal and an end of availability signal of an open core protocol (OCP) as measured at the hub;
a clock register circuit to determine a clock period that is a constant value;
a number of transfers circuit to measure a number of transfers as measured at the hub; and
a data width register circuit to determine a data width that is another constant value.

18. The apparatus of claim 17:
further including a throughput computing circuit to determine a product of the time period and the clock period and another product of the number of transfers and the data width;
wherein the data width is measured as a data per transfer;
wherein the number of transfers circuit is a counter-type circuit; and
wherein the time consumed circuit is the counter-type circuit.

19. The apparatus of claim 18 wherein a computing circuit computes a throughput value as a quotient of the product and the other product.

20. The apparatus of claim 19 wherein the time consumed circuit initiated a measurement of the time period when the start of availability signal switches from a logic low state to a logic high state and terminates the measurement of the time period when an end of availability signal switches from another logic high state to another logic low state.

* * * * *